P. RASMUSSEN.
AUTOMATICALLY OPERATING MATERIAL SPRINKLING HOPPER FOR MARSHMALLOW OR OTHER MATERIAL DEPOSITING MACHINES.
APPLICATION FILED AUG. 16, 1921.
1,397,658.
Patented Nov. 22, 1921.
2 SHEETS—SHEET 2.
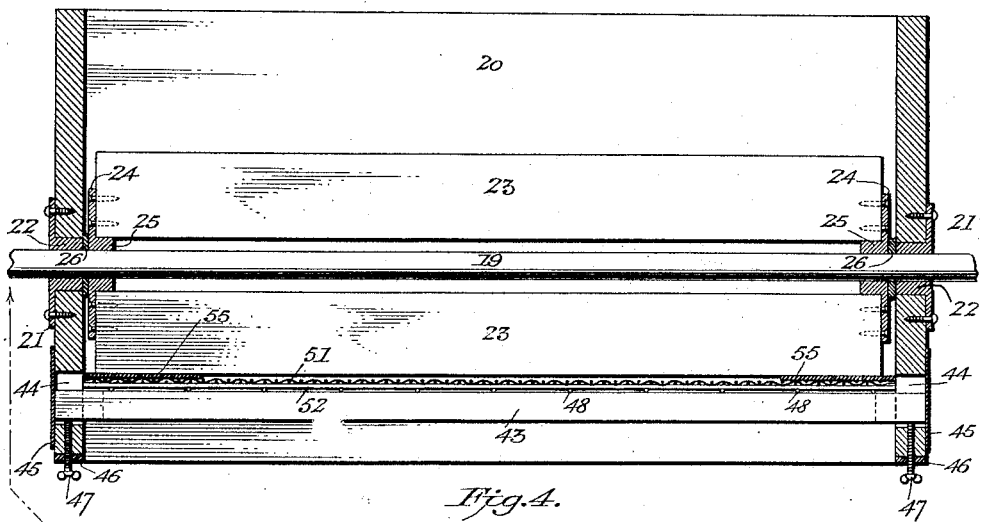
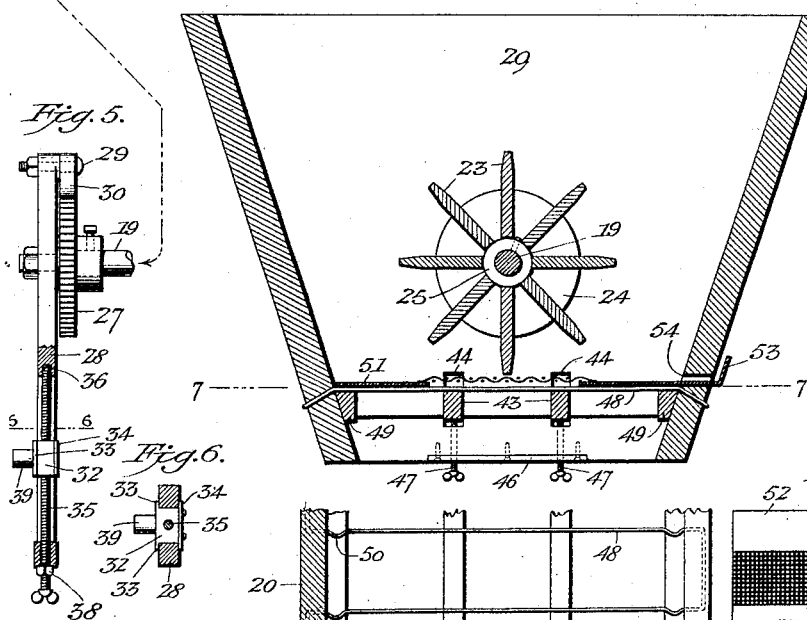
Inventor:
Peter Rasmussen
By H. S. Bailey Attorney

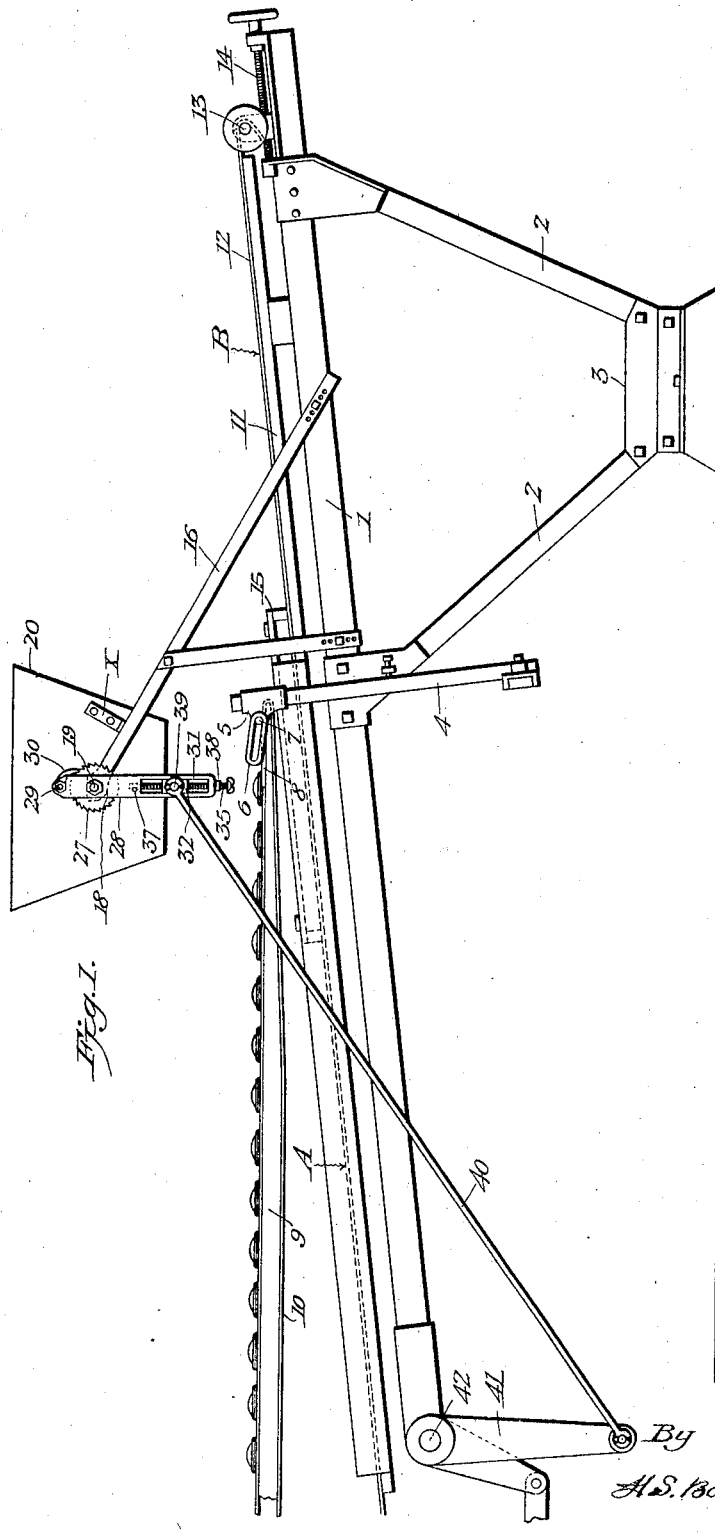

UNITED STATES PATENT OFFICE.

PETER RASMUSSEN, OF DENVER, COLORADO.

AUTOMATICALLY-OPERATING MATERIAL-SPRINKLING HOPPER FOR MARSHMALLOW OR OTHER MATERIAL DEPOSITING MACHINES.

1,397,658.	Specification of Letters Patent.	Patented Nov. 22, 1921.

Application filed August 16, 1921. Serial No. 492,729.

*To all whom it may concern:*

Be it known that I, PETER RASMUSSEN, a citizen of the United States of America, residing at the city and county of Denver and State of Colorado, have invented new and useful Automatically-Operating Material-Sprinkling Hoppers for Marshmallow or other Material Depositing Machines, of which the following is a specification.

This invention relates to improvements in automatically operated material sprinkling hoppers for use in connection with marshmallow or other material depositing machines.

The object of the invention is to provide, in connection with a machine for depositing marshmallow or other material upon successive rows of cakes, a hopper for uniformly sprinkling various materials, such as grated cocoanut, or peanuts, sugar, etc., upon the freshly deposited marshmallow, or other material, as said rows of cakes are moved forward.

Further, to provide a material sprinkling hopper for this purpose, provided with a rotatable, horizontally disposed agitator, comprising a series of supported radial blades or paddles, and a removable screen adapted to be inserted in said hopper beneath said agitator, and of a mesh corresponding to the character of the material to be supplied to said hopper, said agitator being given either a continuous or an intermittent rotary motion, whereby the material in said hopper is passed through said screen, to sprinkle rows of cakes moved beneath said hopper.

Further, to provide means for varying the length of the discharge outlet through the hopper screens, thereby to accommodate varying lengths in transverse rows of cakes passed beneath the hopper.

These objects are accomplished by the mechanism illustrated in the accompanying drawings, in which:

Figure 1 is a side elevation of a portion of a marshmallow or other material depositing machine, showing the improved material-sprinkling hopper connected therewith.

Fig. 2 is a plan view of Fig. 1, a portion only of the full width of the machine being shown.

Fig. 3 is a vertical, longitudinal sectional view of the sprinkling hopper on a larger scale than that shown in Figs. 1 and 2.

Fig. 4 is a vertical, transverse sectional view thereof.

Fig. 5 is an elevation, partly in section, of the operating mechanism for the hopper agitator.

Fig. 6 is a horizontal sectional view on the line 6—6 of Fig. 5.

Fig. 7 is a horizontal sectional view of a portion of the hopper on the line 7—7 of Fig. 4.

Fig. 8 is a plan view of one of the hopper screens, and

Fig. 9 is a perspective view of one of the plates for decreasing the length of the discharge outlet through the hopper screen.

The sprinkling hopper embodying my present invention is adapted for use in connection with machines used in the baker's art for depositing marshmallow, chocolate, and other materials of a pasty nature, upon rows of cakes or cookies, which are then carried forward beneath the said hopper to receive a sprinkling of grated cocoanut, or peanuts, sugar, or any other material which may be used for this purpose. I have not illustrated that part of the machine which receives and discharges the pasty material upon the cakes, nor the mechanism by which the cakes are moved forward in rows to receive the said pasty material, as these mechanisms form no part of the present invention. I have, however, illustrated that portion of the machine which supports the improved sprinkling hopper, the endless conveyer which carries the cakes forward beneath the said hopper, and the endless conveyer which supports the trays upon which the sprinkled cakes are deposited as will be hereinafter fully set forth.

Referring to the accompanying drawings:

The numeral 1 indicates one of the side bars of a common type of machine for depositing marshmallow and other pasty materials upon cakes, and 2 refers to standards which support the rear ends of the side bars, and are bolted at their lower ends to a base 3, which is secured to the floor. The side bars 1, incline upwardly toward their rear ends, as shown in Fig. 1. Uprights 4, are secured to the side bars 1, intermediate the length of the said bars, and upon the upper ends of these uprights—only one being shown—are secured brackets 5, having slotted arms 6, in which are supported trunnions 7, on the ends of metal straps 8, which are secured to the adjacent end portion of a horizontal table 9, thus supporting this end of the table, which is tapered to a thin, rounded edge. An endless, longitudinal belt 10, passes over and under this table, the upper lap of the belt resting upon the table, and the belt is given an intermittent movement. Only enough of the belt and table are shown to illustrate the manner of carrying the coated cakes forward to a point beneath the sprinkler and the mechanism for imparting an intermittent movement to the belt is omitted. Below the table 9, is a table 11, having the same inclination as the side bars 1, upon which it is supported. An endless belt 12, also having an intermittent movement, passes over this table, its upper lap resting thereon. The end of the table 11, extends a considerable distance beyond the end of the table 9, and the belt 12, passes around a roller 13, which is mounted in bearings in threaded engagement with screw rods 14, which are supported in bearings on the adjacent end portions of the side bars 1. The endless belt 12, forms a carrying means for cake boards or trays 15, which pass beneath the end of the board 9, and receive the rows of cakes which are deposited thereon by the endless belt 12, the trays being placed upon the belt at the point A, by an attendant, and removed therefrom at the point B.

The mechanism thus far described is in common use, and, by itself, forms no part of the present invention; but the improved sprinkler which constitutes the present invention, is supported upon the machine above the rear end of the belt 10, and is operated with respect to the movement of the said belt, as will now be set forth.

Upon each side bar 1, and near the rear end thereof, is adjustably secured one end of an inclined arm 16, which is supported intermediate of its length by an upright 17, one end of which is bolted to the said arm, while its opposite end is adjustably connected to the side bar. The free ends of the arms 16, extend beyond and above the rear end of the table 9, and are formed with bearings 18, which are adapted to support the end portions of a shaft 19, which in turn supports the improved sprinkling hopper 20. This hopper may be constructed either of wood or metal, and its sides are inclined while its ends are preferably vertical. Upon each end of the hopper is bolted a metal plate 21, having an integral bearing hub 22, which fits in a hole in the said end of the hopper, and the shaft 19, passes through these hubs and a short distance beyond each end of the hopper.

Upon the shaft 19, is mounted an agitator or stirrer, comprising a number of radial blades or paddles 23, preferably eight, the ends of which are secured by screws to circular flanges 24, formed upon hubs 25, which are rigidly mounted on the shaft 19, the inner edges of the blades resting upon the hubs 25, as shown. Washers 26, are interposed between the flanges 24, and the ends of the hopper, and prevent the flanges from bearing against the ends of the hopper.

Upon one end portion of the shaft 19, is rigidly secured a ratchet wheel 27, and adjoining the ratchet wheel is loosely mounted a lever 28, which extends a short distance above the ratchet wheel and a greater distance below the same. A bolt 29 passes through the upper end of the lever, upon which is loosely mounted a pawl 30, which is adapted to engage the teeth of the ratchet wheel. The portion of the lever 28, below the ratchet wheel is formed with a guideway slot 31, in which is slidably mounted a block 32, having flanges or shoulders 33, which engage one side of the lever. A plate 34, of greater width than the block, is screwed to the other side of the same, and this plate and the flanges 33, hold the block in the guideway, as will be understood by reference to Fig. 6. A screw rod 35, extends up through an unthreaded hole in the lower end of the lever, and through a threaded hole in the block 32, and the upper end of this rod is formed with an annular groove 36, and extends loosely into a hole in the upper wall of the guideway slot, 31. A pin 37, passes through the lever so as to intersect the groove 36, and by this means the screw rod is held in the lever, but permitted to be turned in either direction, whereby the block 32, may be raised or lowered in the guideway 31. The block 32, is held in any desired position in the guideway by a jam nut 38, on the screw rod, which is screwed against the lower end of the lever 28, thereby preventing accidental turning of the screw rod. A stud 39, projects from the outer face of the block 32, and a rod 40, is connected at one end to this stud, and at its opposite end to an arm 41, on a rock shaft 42, which forms a part of the mechanism of the main machine. This shaft imparts an oscillating movement to the arm 41, by which the rod 40, is reciprocated, and the lever 28, is thereby oscillated, causing the pawl 30, to engage and turn the ratchet wheel 27, on each alternate swing of the lever 28, whereby the agitator is given an intermittent rotary motion. A stop X, on each end of the hopper, engages the arms 16, and prevents the hopper from turning when the pawl turns the ratchet wheel. It may be desirable, however, to rotate the agitator continuously, and the invention contemplates either a continuous or an intermittent rotation of the said agitator.

A pair of spaced longitudinal bars 43, extend across the hopper near the bottom thereof, and into slots 44, in the ends of the hopper, the outer end of which are closed by plates 45, which also prevent endwise movement of the bars. A metal strip 45, is secured in the bottom edge of each end of the hopper, and each of these strips is provided with threaded holes which are in vertical line with the slots 44. Thumb screw rods 47, are screwed through the threaded holes in the strips 46, and up through the hopper ends and into the slots 44, in position to support the ends of the bars 43, and in this way the bars 43 can be raised or lowered for a purpose to be presently explained.

A plurality of spaced cross wires 48, extend transversely across the hopper and rest upon the bars 43, and also upon fixed bars 49, which are secured to the sides of the hopper. The wires 48, may be independent wires, or they may all form part of a single wire, which is woven back and forth through holes in the sides of the hopper, as clearly shown in Fig. 7. The cross wires 48, are crimped at points adjoining the sides of the hopper, as shown at 50, and these crimps permit a slight yielding or lengthening of the wires 48, when the bars 43, are raised by the thumb screws 47. The wires 48, are adapted to support screens 51, of different mesh, which are adapted to sift or sprinkle out such material as grated cocoanut, grated nuts, sugar, etc., which is fed to the hopper. The screens 51, comprise outside tin strips 52, which are connected by a central strip of screen wire, the mesh of which is of a degree of coarseness to suit the material to be passed through the screen, and one of the strips is bent up along its outside long edge to form a grasping flange 53. One side of the hopper is provided with a longitudinal slot 54, which is on a level with the wires 48, and extends the entire length of the hopper, and the screen is passed through this slot in one side of the hopper and slid over on the wires 48, until it abuts against the opposite side of the hopper, the flange 53, enabling the screen to be easily inserted and withdrawn. The screen is now supported on the wires 48, and beneath the agitator, and by adjusting the thumb screws 47, the bars 43, and the wires 48 may be raised or lowered so as to increase or diminish the distance between the screen and the edge of the lowermost agitator blade 23, to suit the character of the material in the hopper.

If it is desired to shorten the length of the screen outlet, I provide metal strips 55, which can be slipped in over the top of the screen, at each end of the hopper, as shown in Fig. 3, thereby shortening the length of the screen in proportion to the width of the strips 55.

In operation, the sprinkling hopper is supported on the marshmallow dispensing machine, and above the rear end portion of the cake conveying belt 10, in the manner shown in Fig. 1. The cakes which are fed onto the belt 10, in spaced transverse rows, and have received a coating of marshmallow or other material, are carried forward in intermittent stages by the said belt 10, and discharged row by row from the terminal of the belt, onto a tray 15, carried by the belt 12, which also has an intermittent movement, in unison with the belt 10. As each row of cakes on the belt 10, reaches a point centrally beneath the hopper, the belt 10, stops and remains at rest for a period, during which the agitator is partially rotated, and a portion of the material in the hopper is thereby sifted through the screen and drops down upon the row of cakes, the movable parts being so rotated that when the belt 10, is moving, the agitator is at rest, and the lever 28, is swung by the rod 40, to move the pawl 30, back over the ratchet wheel 27, for another engagement. The sprinkled cakes are next discharged from the belt 10, onto the tray 15, in spaced rows, and as each tray is filled it is removed by an attendant to make room for the next succeeding tray. The cakes are thus uniformly sprinkled, irrespective of the character of the material used, as the screen is suited in mesh to the material used, and adjusted with respect to the agitator, to meet the requirement in the case.

Having described my invention, what I claim as new and desire to secure by Letters Patent, is:

1. In a device of the character described, the combination with an endless conveyer adapted to receive spaced rows of cakes and move them forward by intermittent stages, of a hopper supported above said conveyer having a screened outlet, a rotatable agitator in said hopper, and means for partially rotating said agitator coincident with each pause in the movement of the conveyer, thereby to sprinkle material in said hopper upon the rows of cakes in successive order.

2. In a device of the character described, the combination with an endless conveyer adapted to receive spaced rows of cakes and move them forward by intermittent stages, of a hopper supported above said conveyer, having a screened outlet, a rotatable agitator in said hopper, comprising a series of radial blades, and a pawl and ratchet mechanism for operating said agitator coincident with each pause in the movement of the conveyer, thereby to sprinkle material in said hopper upon the rows of cakes in successive order.

3. In a device of the character described, the combination of a frame, an endless belt mounted thereon and adapted to receive spaced rows of cakes and move them forward by intermittent stages, a hopper supported on said frame above said belt, having a screened outlet, a rotary agitator in said hopper, comprising a shaft having a series of radial blades secured thereon, a ratchet wheel rigidly mounted on said shaft, a lever loosely mounted on said shaft, having a pawl for engaging the teeth of said ratchet wheel, and means for oscillating said lever to cause said pawl and ratchet mechanism to operate said agitator coincident with each pause in movement of the endless belt, thereby to sprinkle material in the hopper upon the rows of cakes in successive order.

4. In a device of the character described, the combination with a frame and an endless belt mounted thereon adapted to receive spaced rows of cakes and move them forward by intermittent stages; of a hopper mounted on said frame above said belt, having a screened outlet, a rotary agitator in said hopper, comprising a shaft having a series of radial longitudinal blades secured thereon, a ratchet wheel rigidly mounted on said shaft, a lever loosely mounted on said shaft, having a pawl for engaging the teeth of said ratchet wheel, an arm mounted on said frame adapted to have an oscillating movement, a rod connecting said arm and said lever to impart an oscillating movement to said lever, thereby to cause said pawl and ratchet mechanism to operate said agitator coincident with each pause in the movement of the belt, thereby to sprinkle material in the hopper upon the rows of cakes in successive order, and means for varying the throw of said lever.

5. In a device of the character described, the combination with a hopper, of a removable screen in said hopper adjacent its outlet, adjustable means for supporting said screen, a shaft mounted longitudinally in said hopper, a series of longitudinal, radially disposed blades secured upon said shaft, and a pawl and ratchet mechanism for operating said shaft.

6. In a device of the character described, the combination with a hopper of a removable screen in said hopper adjoining its outlet, adjustable bars supported in the ends of said hopper, and cross wires on said bars for supporting said screen, a longitudinal shaft mounted in the ends of said hopper, having flanged hubs rigidly mounted thereon and radial longitudinal blades secured at their ends to said flanges; a ratchet wheel rigidly mounted on the shaft, and a lever loosely mounted on the shaft, having a pawl for engaging the teeth of the ratchet wheel.

7. In a device of the character described, the combination with a hopper, of a rotatable paddle form of agitator in said hopper, a pawl and ratchet mechanism for operating said agitator; longitudinal bars mounted in slots in the ends of said hopper, transverse wires supported on said bars and extending through the sides of said hopper, a screen supported on said wires, and thumb screws in said hopper ends, in engagement with the ends of said bars, for adjusting the bars, thereby to properly position the screen with respect to the agitator.

8. In a device of the character described, a hopper, a longitudinal shaft mounted therein, having radial, longitudinal blades secured thereon; a ratchet wheel rigidly mounted on said shaft, a slotted lever loosely mounted on the shaft having a pawl for engaging the ratchet wheel, an adjustable block in said slotted lever adapted to be connected with lever-operating means, and a removable screen in said hopper, beneath the agitator, and means for adjusting the same with respect to the said agitator.

9. In a device of the character described, the combination with a hopper, an agitator therein, and means for operating the same, a wire passed back and forth through the sides of said hopper, and below the agitator, to form a series of cross wires, each of which is provided with a crimp adjoining each side of the hopper, longitudinal bars mounted at each end in vertical slots in the ends of the hopper, upon which said cross wires rest, a screen which is passed through a slot in one side of said hopper and rests upon said cross wires, and thumb screw in the hopper ends, which bear against the under sides of the end portion of said bars to adjust them vertically, whereby the position of the screen may be varied with respect to the agitator.

10. In a device of the character described, the combination with a hopper, a rotary agitator therein and means for operating the same; of a screen removably inserted beneath said agitator, through a slot in one side of said hopper and comprising spaced longitudinal metal strips which are connected by a strip of screen material, means for supporting the screen, and means for adjusting the supporting means, thereby to vary the position of the screen with respect to the agitator.

In testimony whereof I affix my signature in presence of two witnesses.

PETER RASMUSSEN.

Witnesses:
G. SARGENT ELLIOTT,
ELIZABETH SMITH.